(12) United States Patent
Nair

(10) Patent No.: US 9,774,503 B2
(45) Date of Patent: Sep. 26, 2017

(54) METHOD, APPARATUS AND SYSTEM FOR AUTOMATICALLY DISCOVERING NODES AND RESOURCES IN A MULTI-NODE SYSTEM

(71) Applicant: Intel Corporation, Santa Clara, CA (US)

(72) Inventor: Mohan K. Nair, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 14/531,008

(22) Filed: Nov. 3, 2014

(65) Prior Publication Data

US 2016/0127191 A1     May 5, 2016

(51) Int. Cl.
   *G06F 15/173*     (2006.01)
   *H04L 12/24*     (2006.01)

(52) U.S. Cl.
   CPC .................................. *H04L 41/12* (2013.01)

(58) Field of Classification Search
   CPC ............................................................ H04L 41/12
   See application file for complete search history.

(56) References Cited

U.S. PATENT DOCUMENTS

| | | | | |
|---|---|---|---|---|
| 2007/0233845 | A1* | 10/2007 | Song | H04L 12/2809 709/223 |
| 2011/0119423 | A1* | 5/2011 | Kishore | G06F 13/102 710/302 |
| 2016/0028596 | A1* | 1/2016 | Lund | H04L 41/5058 709/224 |

OTHER PUBLICATIONS

Narten et al., "Neighbor Discovery for IP version 6", Sep. 2007, Network Working Group.*
U.S. Appl. No. 14/317,308, filed Jun. 27, 2014, entitled "Reducing Latency of Unified Memory Transactions," by Mahesh Wagh.

* cited by examiner

*Primary Examiner* — Ryan Jakovac
(74) *Attorney, Agent, or Firm* — Trop, Pruner & Hu, P.C.

(57) ABSTRACT

In one embodiment, a system comprises: a plurality of compute nodes having a first core, a first memory, and a first fabric; a plurality of input/output (I/O) nodes having a second core, a second memory, and a second fabric and to couple to one or more I/O devices; at least one management node to receive discovery information responsive to execution of a discovery process by the plurality of compute nodes and the plurality of I/O nodes. The discovery information may include resource request information from the plurality of compute nodes and resource availability information from the plurality of I/O nodes. The at least one management node may configure the plurality of compute nodes and the plurality of I/O nodes based thereon. The system may further include an interconnection fabric to couple the plurality of compute nodes, the plurality of I/O nodes, and the at least one management node, where the at least one management node is to enable the one or more I/O devices to be shared between at least some of the plurality of compute nodes based on the discovery information. Other embodiments are described and claimed.

17 Claims, 14 Drawing Sheets

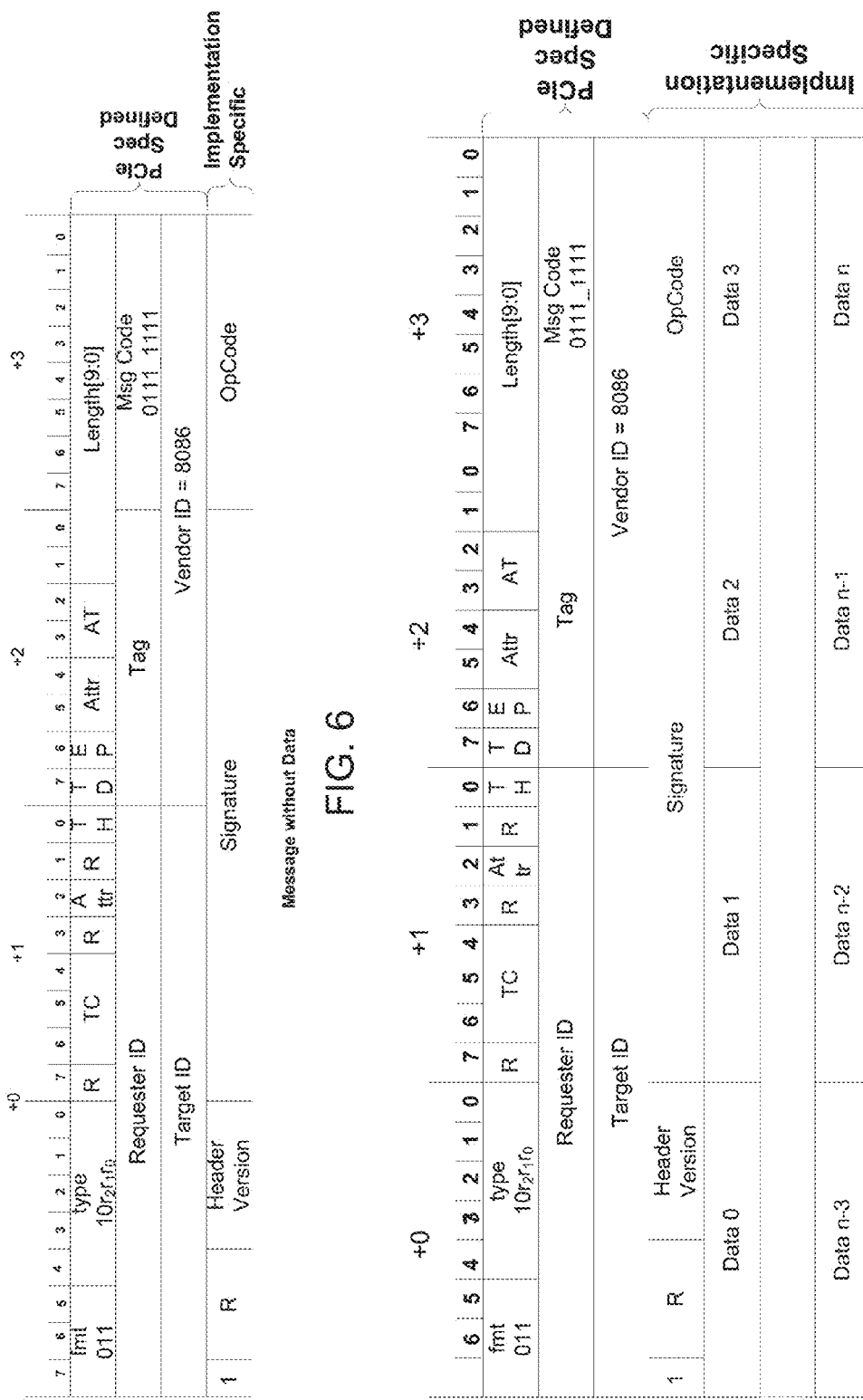

METHOD, APPARATUS AND SYSTEM FOR AUTOMATICALLY DISCOVERING NODES AND RESOURCES IN A MULTI-NODE SYSTEM

TECHNICAL FIELD

This disclosure pertains to computing systems, and in particular (but not exclusively) to automatic discovery of nodes, interconnect topology and resources in a multi-node system.

BRIEF DESCRIPTION OF THE DRAWINGS

FIG. 6 is an illustration of a packet format in accordance with an embodiment.

FIG. 7 is an illustration of another packet format in accordance with an embodiment.

DETAILED DESCRIPTION

Figure 1:
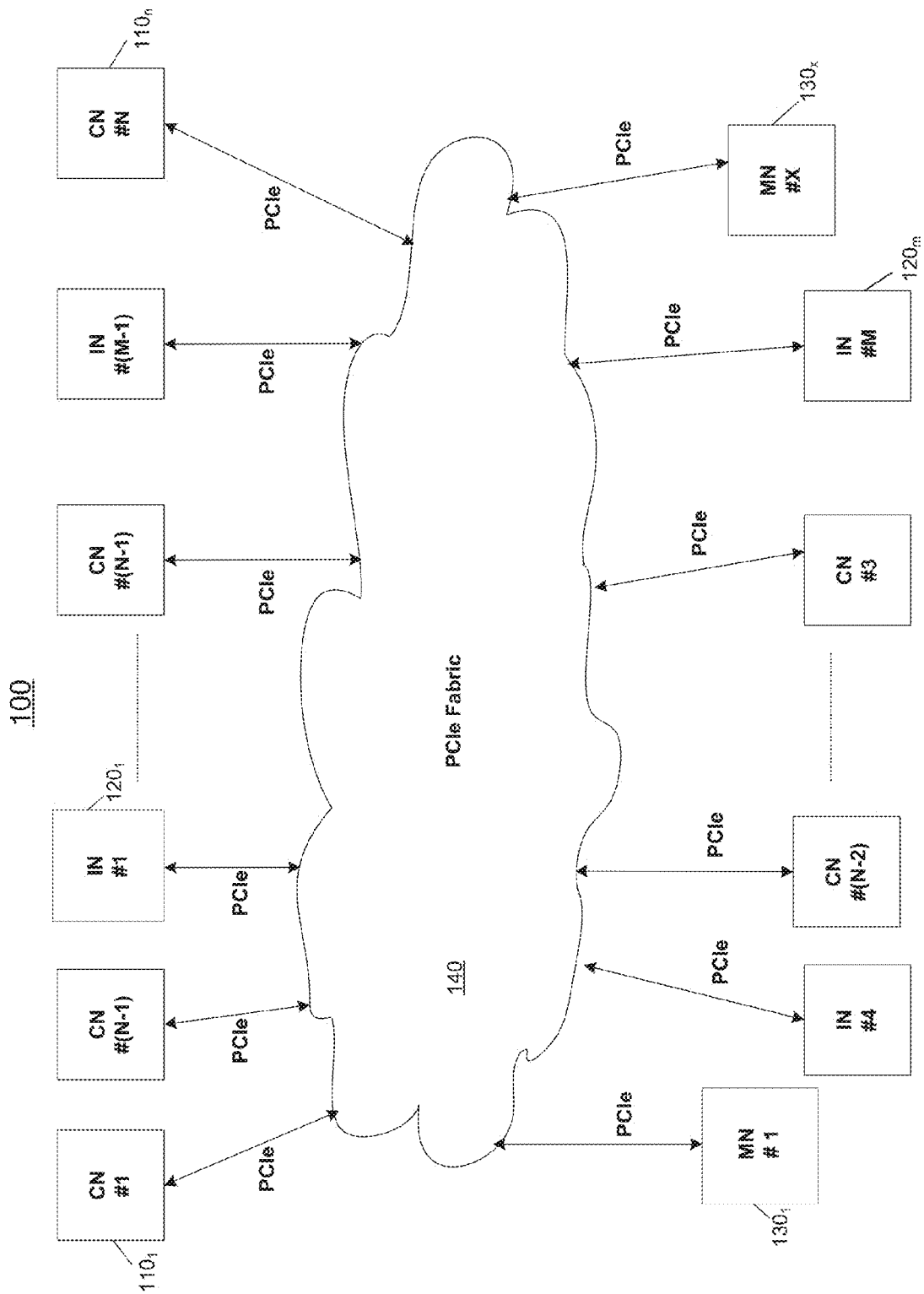
FIG. 1 is a block diagram of a multi-node cluster in accordance with an embodiment of the present invention.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to sever computer systems such as tower, rack, blade, or micro-server computer systems, desktop computer systems or Ultrabooks™, and may be also used in other devices, such as handheld devices, tablet computers (including 2:1 tablets), phablet computers, other thin notebooks, systems on a chip (SOC) devices, and embedded applications. Some examples of handheld devices include cellular phones, smartphones, Internet protocol devices, digital cameras, personal digital assistants (PDAs), and handheld PCs. Embedded applications may typically include a microcontroller, a digital signal processor (DSP), a system on a chip, network computers (NetPC), set-top boxes, network hubs, wide area network (WAN) switches, wearable devices, or any other system that may perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

As computing and semiconductor industries move towards higher integration, where many components of a system are integrated into a single semiconductor device such as a System-On-Chip (SoC), the focus has shifted to define different technologies and network topologies to interconnect these SoCs for scalable multi-node/multi-host/multi-cluster system architectures that provide desired performance at low power, low cost and at the same time provide high levels of reliability, availability and scalability (RAS) in terms of redundancy, failover, etc. Peripheral Component Interconnect Express (herein PCIe) is one of the technologies that has been adopted for such applications in high-performance cloud and data centers due its advantage on performance, low latency and low power over other competing technologies.

A system solution based on PCIe interconnect technology can adopt different network topologies (e.g., fabric interconnection) to connect the nodes with each other. Embodiments provide an automatic means to discover the node interconnect topology, discover the resources required by each node and the resources available at or coupled to each node. In this way, embodiments provide flexibility to build systems with varying network topologies and resources with the same basic building blocks. However there is no available standard method to discover topology and resources in a PCIe fabric-based network.

Embodiments provide techniques to automatically discover a network topology, discover resources required by each node, and the resources available at each node to configure a multi-node system. In the particular embodiments described herein, a PCIe fabric is used as the interconnect technology. However, understand that the scope of the present invention is not limited in this regard and other fabrics can be used in different embodiments.

In a multi-node system, it can be costly to provide dedicated input/output (I/O) resources for each node. Embodiments enable I/O resources to be shared among multiple nodes. To this end, a multi-node system may be configured as described herein to perform a topology discovery. Then based at least in part on this topology, relevant resources and paths may be configured to enable communication between the resources before enabling the sharing of I/O resources among the multiple nodes in the system.

A catch-22 situation can arise as a node is to discover the available I/O resources first before configuration can occur. Embodiments provide an automated way of discovering the topology, resources and configuring the multi-node system to an extent that enables each node to discover its resources for normal functioning. This allows building multi-node systems with different topologies and sharing by using the same building blocks.

Referring now to FIG. 1, shown is a block diagram of a multi-node cluster in accordance with an embodiment of the present invention. As shown in FIG. 1, cluster 100 may be all or a portion of a multi-node clustered system, such as a server computer. Although the scope of the present invention is not limited in this regard, a system formed including cluster 100 may be a rack-based system such as multiple blade servers configured as a set of motherboards located within one or more racks or cabinets.

In the embodiment shown, a plurality of compute nodes $110_1$-$110_n$ are present. Although the scope of the present invention is not limited in this regard, each compute node may generally include one or more processors such as one or more SOC's, a local memory such as a DRAM, and an interconnect fabric (which may include a plurality of ports (both ingress and egress ports)) to enable interconnection with other nodes and a fabric 140, which in an embodiment may be a PCIe fabric.

As further illustrated in FIG. 1, cluster 100 also includes a plurality of I/O nodes $120_1$-$120_m$. As seen, each of these I/O nodes 120 further couples to fabric 140 via a PCIe interconnect. Still with reference to FIG. 1, a plurality of management nodes $130_1$-$130_X$ may be provided. As will be described herein, such management nodes may be implemented using particular I/O nodes or compute nodes. In either case, management nodes 130 may be responsible for implementing a discovery protocol in accordance with an embodiment. Understand while shown at this high level in the embodiment of FIG. 1, many variations and alternatives are possible.

Note that the number of fabric ports is dependent on the network topologies being supported by the clustered system. In one example, nodes with 6 fabric ports can be connected to each other to create any 3-dimensional topology. For a given system, a configuration technique may be used to assign a unique node identifier (NodeID) to each node of the system.

Note that the illustration of FIG. 1 shows a logical connection to fabric 140, however there can be more than one physical connection (e.g., 6 connections for a complete 3-dimensional topology). Based on system configuration, one or more I/O nodes can be configured as a management node that scoreboards the system hardware configuration/resource requirements and executes a configuration and management software stack.

In various embodiments, the nodes of the system may be implemented with hardware to perform a discovery protocol. After complete discovery (of neighbor nodes, all nodes, and resource capability), the system may be appropriately configured. At a high level, the discovery protocol has two steps, namely a neighbor discovery step or protocol and thereafter a node and resource discovery step or protocol. In general, during neighbor discovery, communication may occur among immediately connected nodes to discover immediate neighbor NodeIDs. During node and resource discovery, communication may occur between each node and all other nodes in the clustered system to create a system node map defining the available resources at each node and requested resources by each node.

Prior to these two steps of discovery, each node after power-on reset trains all of its connected fabric ports, e.g., in accordance with a PCIe training protocol. On successful completion of the training, each node has a count of trained fabric links it forms with other connected nodes. At this point, the node is ready to perform the discovery protocol described herein. To this end, each node may include one or more discovery state machines. For purposes of discussion, assume the presence of a single state machine per node to perform both steps of the discovery protocol.

Figure 2:
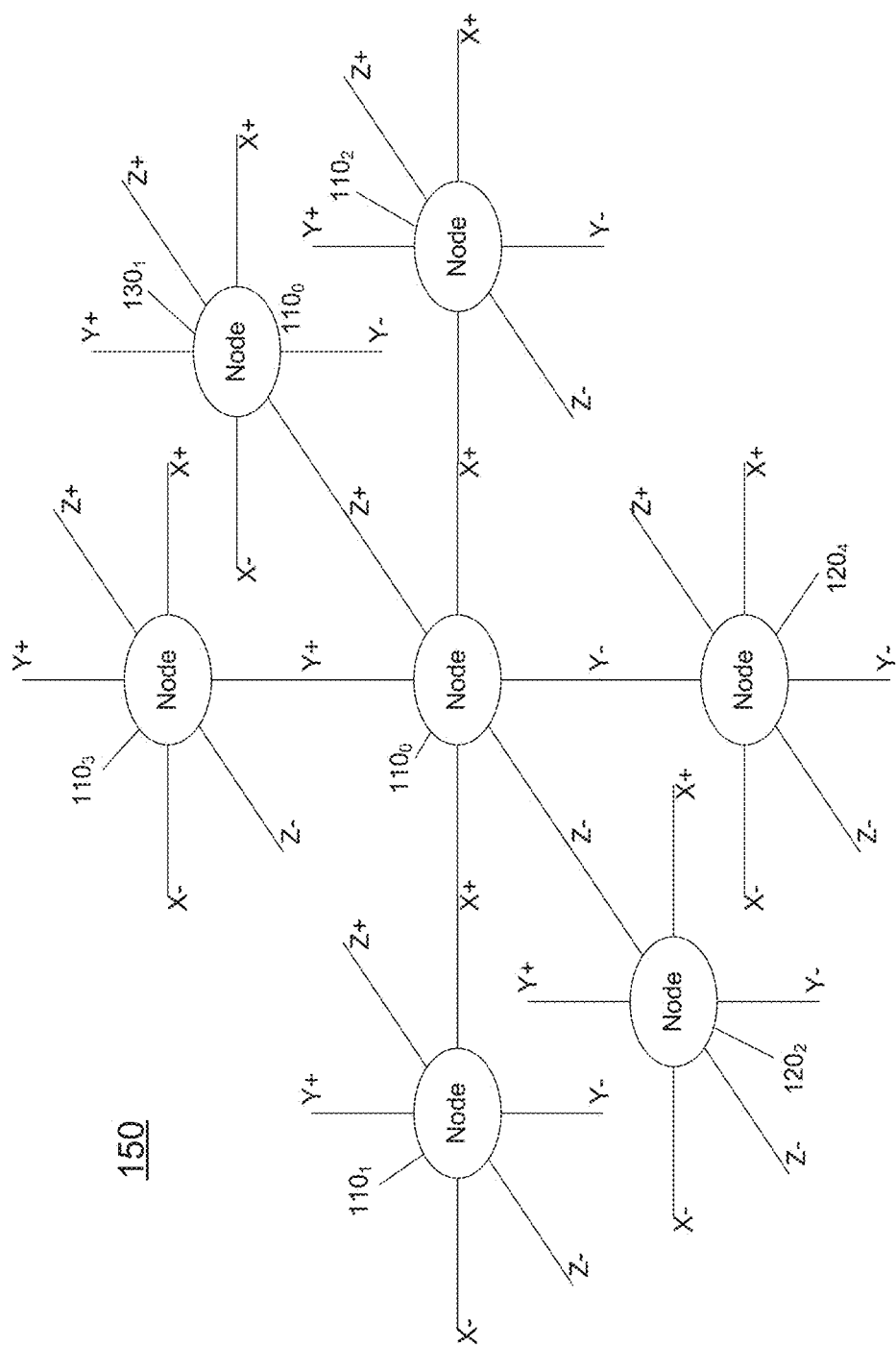
FIG. 2 is an embodiment of an example interconnection topology in accordance with one embodiment.

Understand that nodes may be connected together by various types of topologies in different embodiments. As examples, two or three dimensional topologies or more complex topologies such as a torus, mesh or ring type topology may couple together the various nodes. In an embodiment using PCIe interconnects, a variety of compute, I/O and management nodes may be coupled together to form a desired system configuration. Referring now to FIG. 2, shown is an embodiment of an example interconnection topology in accordance with one embodiment. As shown in FIG. 2, network topology 150 is a three-dimensional topology including a plurality of nodes. In the embodiment shown, multiple compute nodes 110, multiple I/O nodes 120 and a single management node 130 are present. For ease of illustration, only connections to a single compute node $110_0$ shown (namely 6 interconnections to other nodes in the embodiment of FIG. 2). Of course understand that each of the other nodes present may be coupled to additional nodes (in an embodiment in which maximum number directly connecting nodes 6). As illustrated, compute node $110_0$ couples to a pair of nodes $110_1$ and $110_2$ in a first dimension, couples to nodes $110_3$ and $120_1$ in a second dimension, and couples to nodes $120_2$ to $130_1$ in a third dimension. Of course, many other topologies and interconnections of nodes are possible.

Figure 3:
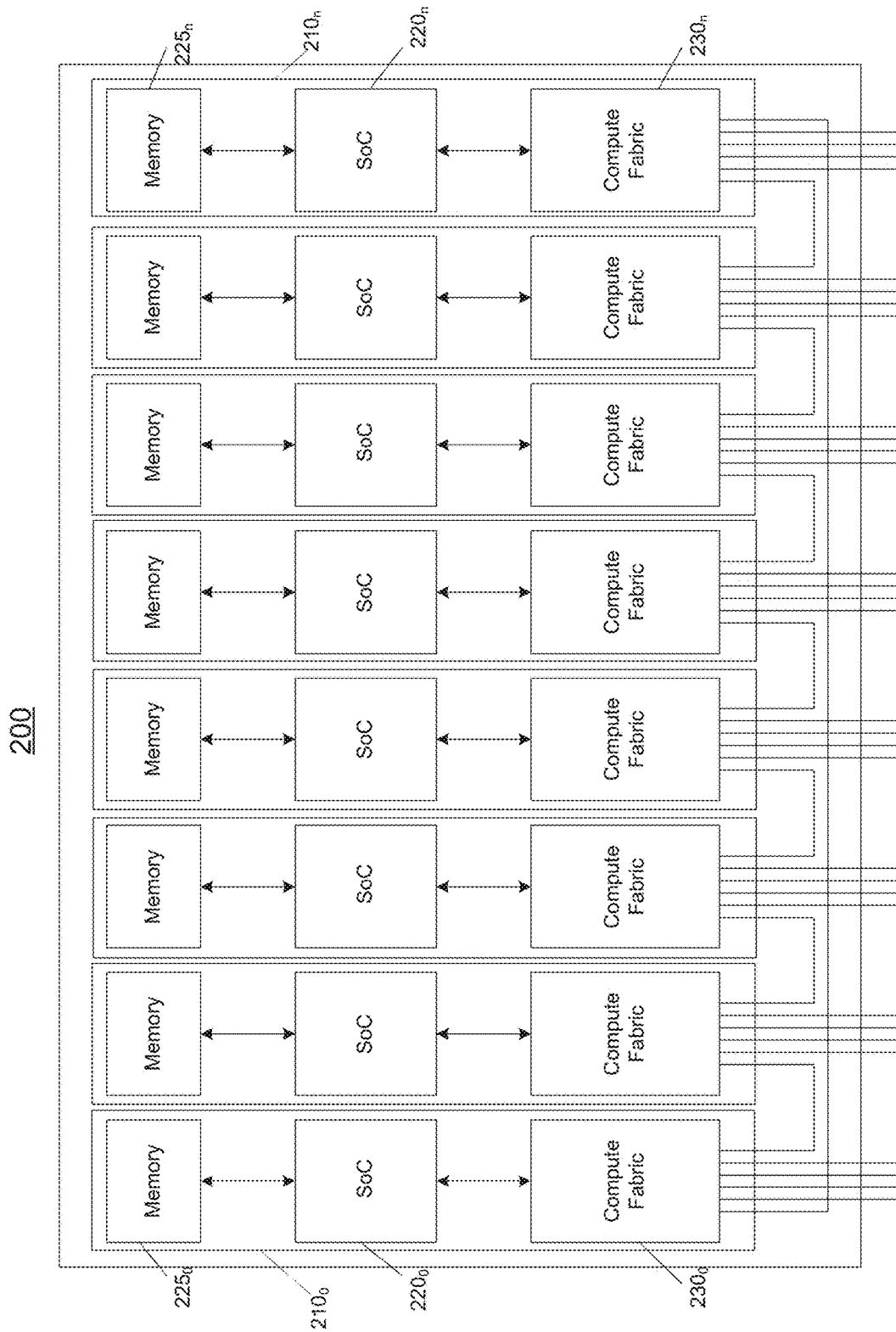
FIG. 3 is a block diagram of a compute module in accordance with an embodiment of the present invention.

Referring now to FIG. 3, shown is a block diagram of a compute module in accordance with an embodiment of the present invention. As shown in FIG. 3, compute module 200 may take the form of a motherboard to be configured within a server rack. As seen, compute module 200 includes a plurality of compute nodes $210_0$-$210_n$. In the particular embodiment shown, 8 such compute nodes are present. Of course understand the scope of the present invention is not limited to this particular compute module, and more or fewer compute nodes may be present. Of course understand that in different implementations, a given module or motherboard may include combinations of disparate nodes, e.g., compute nodes, I/O nodes and management nodes.

Still with reference to FIG. 3, each compute node 210 includes a SoC 220. While the scope of the present invention is not limited in this regard, each SoC 220 may include one or more processor cores, one or more graphics engines, and additional circuitry and logic such as a so-called uncore that includes various interface circuitry, controllers, and one or more cache memories and so forth. In an embodiment, the processor cores may be homogeneous cores or a variety of heterogeneous cores.

As seen, SoC 220 couples to a memory 225, which in an embodiment may be a DRAM such as one or more dual inline memory modules (DIMMs). As such, memory 225 acts as a local memory for a given compute node 210. In turn, SoC 220 further couples to a compute fabric 230, which may include interconnect circuitry (including a plurality of ingress and egress ports) to provide interconnection between different compute nodes and other locations. In the particular embodiment shown, each compute node 210 is coupled by way of point-to-point (PtP) links to two local compute nodes 210 and in turn to one or more other locations external to module 200 via additional PtP links. Although shown at this high level in the embodiment of FIG. 3, many variations and alternatives are possible.

Figure 4:
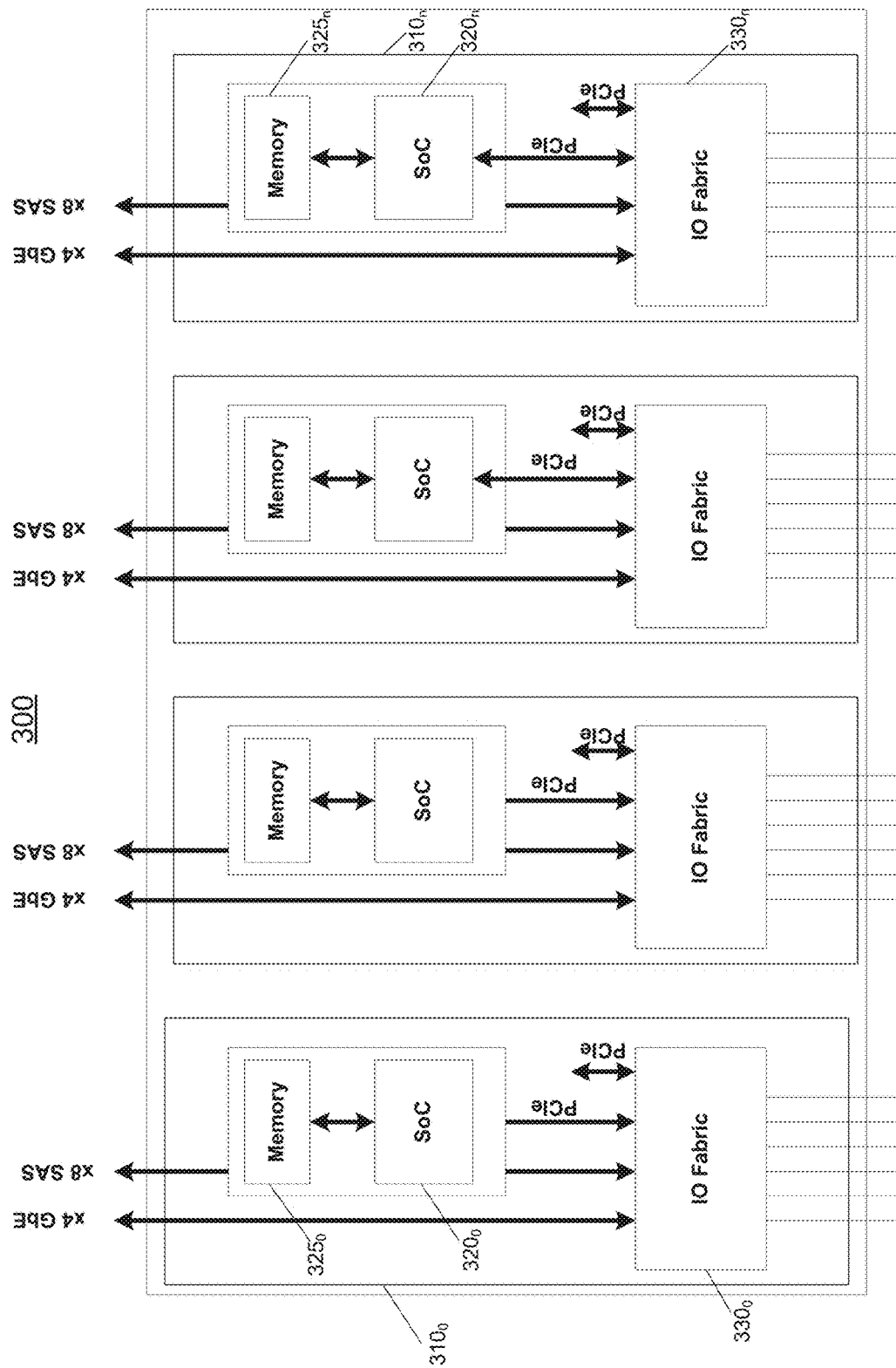
FIG. 4 is a block diagram of an input/output (I/O) module in accordance with an embodiment of the present invention.

Referring now to FIG. 4, shown is a block diagram of an I/O module in accordance with an embodiment of the present invention. As shown in FIG. 4, I/O module 300 may take the form of a motherboard to be configured within a server rack. As seen, I/O module 300 includes a plurality of I/O nodes $310_0$-$310_n$. In the particular embodiment shown, 4 such I/O nodes are present, but in other embodiments more or fewer nodes may be present.

Still with reference to FIG. 4, each I/O node 310 includes a SoC 320. While the scope of the present invention is not limited in this regard, each SoC 320 may include one or more processor cores, one or more graphics engines, and additional circuitry and logic such as a so-called uncore that includes various interface circuitry, controllers, and one or more cache memories and so forth. In an embodiment, the processor cores may be homogeneous cores or a variety of heterogeneous cores.

As seen, SoC 320 couples to a memory 325, which in an embodiment may be DRAM. Memory 325 acts as a local memory for a given I/O node 310. In turn, SoC 320 further couples to an I/O fabric 330, which may include interconnect circuitry (including a plurality of ingress and egress ports) to provide interconnection to various off-module locations.

As further illustrated in FIG. 4, each node 310 further couples to a plurality of resources (such as network and storage resources), such as by way of gigabit Ethernet and attached storage connections. Although shown at this high level in the embodiment of FIG. 4, many variations and alternatives are possible.

In an embodiment, to perform neighbor node discovery, the state machine in each node sends a pre-programmed number of query neighbor messages with a message routing field of each message set to "Local—Terminate at Receiver" on all of its trained egress ports. Responsive to such messages, the state machine in each node is configured to determine whether a pre-programmed number of consecutive query neighbor messages have been received without any error on all of its trained ingress ports or expiration of a pre-programmed timer. If an ingress port receives this predetermined number of query neighbor messages without any error, then the node transmits a pre-programmed number of consecutive neighbor response messages with a message routing field set to "Local—Terminate at Receiver" on its corresponding egress port. This process continues until a selected number of neighbor response messages are transmitted on the egress ports of each node on which a corresponding ingress port query neighbor message is received.

At this point, the state machine in each node is configured to determine whether a pre-programmed number of consecutive neighbor response messages have been received without any error on all of its trained ingress ports. This process completes when each node receives neighbor response messages on all of its trained ingress ports or a pre-programmed time out period expires.

At the end of this step of the discovery protocol, each node in the clustered system has a map for its directly connected nodes, called a neighbor NodeID map, which in an embodiment includes information to identify nodes that are connected to the node immediately through one of its trained fabric ports. In one embodiment, a neighbor NodeID map for a node with NodeID as $NodeID_i$ (i=1, 2, ... n, where n is an integer that represents number of nodes in the clustered system) and PortID as $PortID_j$ (j=1, 2, ... n, where n is an integer that represents the number of fabric ports in any given node) may take the form of:

$NodeID_i$ {number of Ports(N), number of trained ports (K), NodeIDs connected to each ports of the node ... }.

In an embodiment, the ports of a node in a neighbor NodeID map may be represented in an increasing order. In one embodiment, an example for $NodeID_x$ with 6 ports with all 6 ports trained with $PortID_1$ connected to $NodeID_a$, $PortID_2$ connected to $NodeID_f$... is represented as:

$NodeID_x$ {6, 6, $PortID_1.NodeID_a$, $PortID_2.NodeID_f$, $PortID_3.NodeID_i$, $PortID_4.NodeID_k$, $PortID_5.NodeID_y$, $PortID_6.NodeID_m$}.

An example for $NodeID_y$ with 6 ports with only 4 ports trained (ports 2 and 4 not trained) is represented as:

$NodeID_y$ {6, 4, $PortID_1.NodeID_b$, $PortID_3.NodeID_g$, $PortID_5.NodeID_x$, $PortID_6.NodeID_m$}.

Figure 5A:
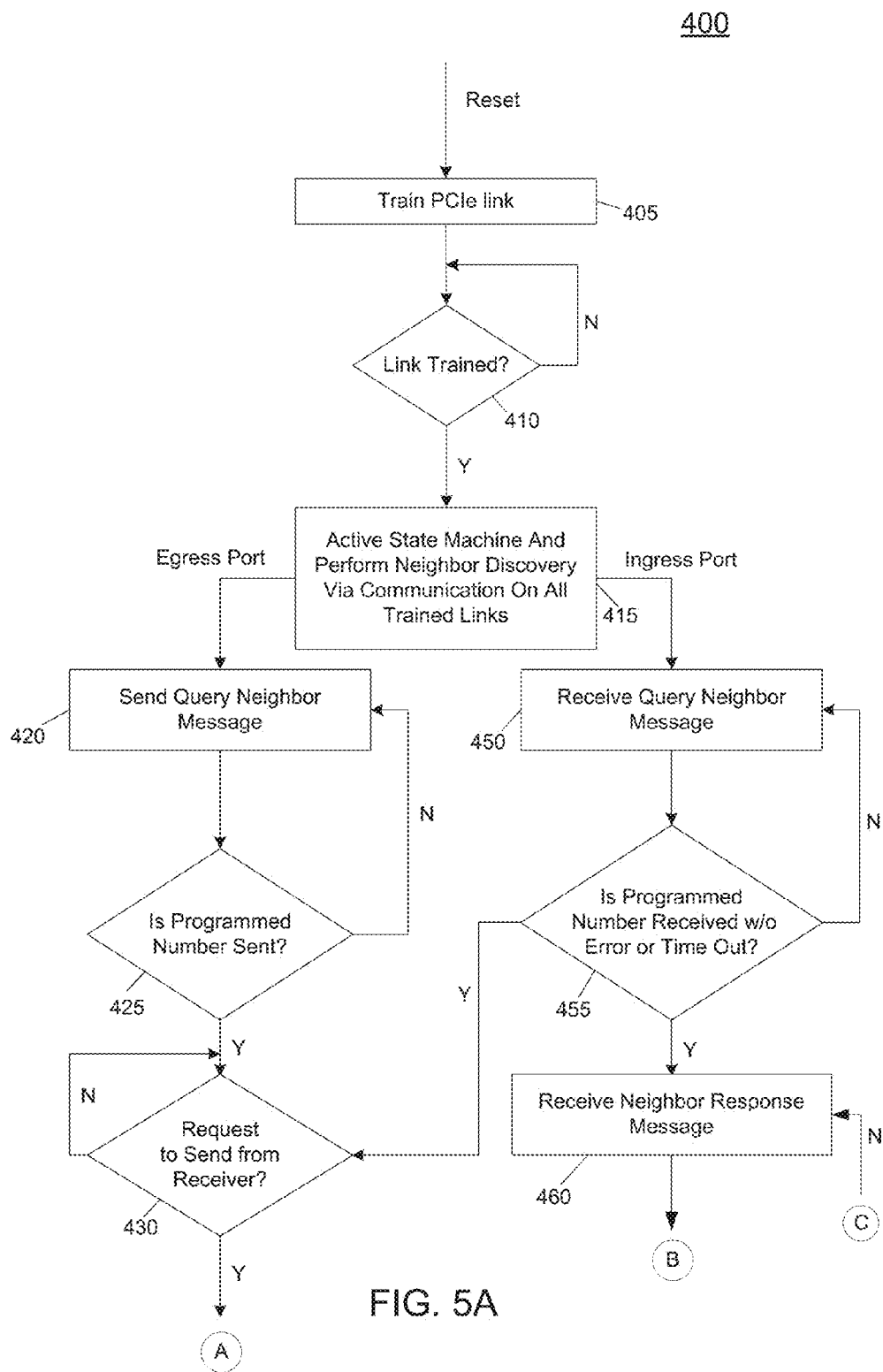
FIGS. 5A and 5B are flow diagrams of a method of a first step of a discovery and configuration process in accordance with an embodiment of the present invention.
Figure 5B:
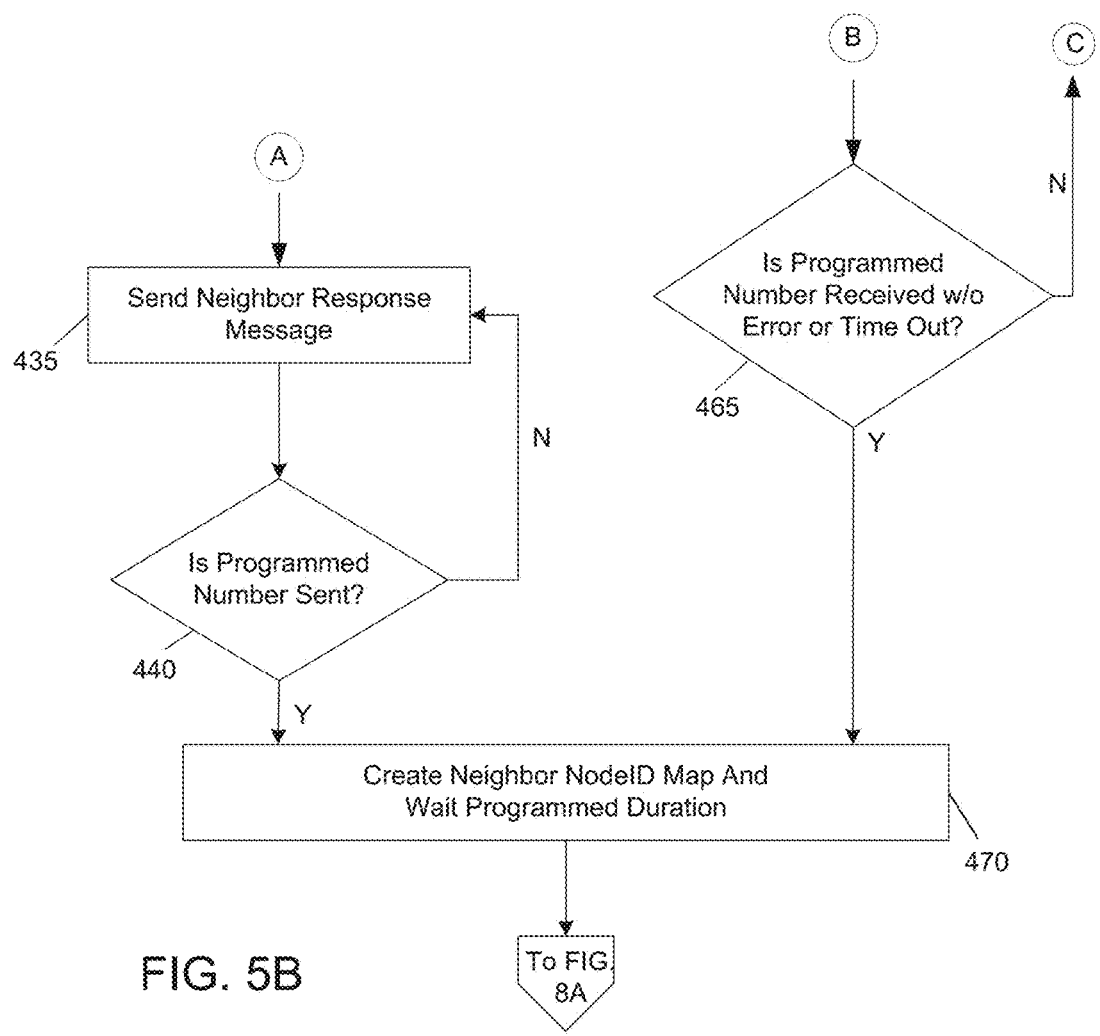

Referring now to FIGS. 5A and 5B, shown is a flow diagram of a method of a first step of a discovery and configuration process in accordance with an embodiment the present invention. As shown in FIG. 5A, method 400 begins responsive to a reset of a system, e.g., a multi-cluster system. At block 405 as the system becomes functional, various links coupled to a node, e.g., multiple PCIe links are trained (block 405). In an embodiment a conventional PCIe training protocol may be performed. At diamond 410 it is determined whether a given link has been trained. If so, control passes to block 415 where a state machine is activated. Furthermore, the state machine may be configured to perform neighbor discovery in accordance with an embodiment. To this end, a neighbor discovery communication may be sent on all trained links.

Still in reference to FIGS. 5A and 5B, various branches of method 400 are performed depending on whether a particular port is an egress port or an ingress port. For each egress port, at block 420 a particular message is sent. More specifically, a query neighbor message is sent to issue a query to a directly coupled neighbor via this egress port. Understand that various implementations of a query neighbor message may occur in different embodiments. Next it is determined whether a programmed number of such messages are sent (diamond 425). If not, control passes back to block 420 where the query neighbor message is sent gain. Although the scope of the present invention is not limited in this regard, in an embodiment 16, 32, 64 or another number of such messages may be sent, corresponding to the programmed number of messages.

Next when it is determined that the programmed number of messages have been sent, control passes to diamond 430. There it is determined whether a request has been received from the receiver, namely a receive logic of the node, which indicates that the programmed number of query neighbor messages have been received (as described in ingress port operations below). When such request is received, control passes to block 435 (FIG. 5B) where a particular response message is sent to the neighbor. In the embodiment shown, this message is a neighbor response message. As above, a predetermined number of such messages may be sent, as determined at diamond 440. When the programmed number of such messages have been sent, control passes to block 470 where a neighbor node ID map may be created (and an entry associated with this particular neighbor may be updated accordingly). Thereafter method 400 concludes.

Still in reference to FIGS. 5A and 5B, a different branch occurs for an ingress port. As seen, this branch begins at block 450 where a particular message is received, namely a query neighbor message. Next it is determined whether a programmed number of such messages have been received without error or timeout (diamond 455). If not, control passes back to block 450, for receipt of an additional query neighbor message. When it is determined that the programmed number of such query messages have been received, control passes to block 460 where a particular message is received, namely a neighbor response message. Again it is determined whether a programmed number of such messages have been received without error or timeout (diamond 465). If not control passes back to block 460 until it is determined that the programmed number of neighbor response messages has been received. Thereafter control passes to block 470 as discussed above where the neighbor node ID map is updated accordingly. While shown at this high level in the embodiment of FIGS. 5A and 5B, many variations and alternatives are possible.

After the completion of this neighbor node discovery step, the state machine in each node transitions into the node discovery and resource discovery step, which in an embodiment may begin after a programmable duration from the time that a given node generates its node ID map. This delay may ensure that all nodes have a valid node ID map before it starts the node and resource discovery step. In this step of the discovery protocol, each node communicates with every other node in the clustered system with its node type, available resources that can be shared with other nodes, resources required by it, among other potential information. Although the scope of the present invention is not limited in this regard, such information may include resource types, available network type and bandwidth, storage type and size, resources type and size that can be dedicated to a node (e.g., flash), number of compute nodes that can optimally share a shared resource, etc. In general, compute nodes may be configured to inform regarding their required resources (e.g., storage type and size, network type and bandwidth, dedicated resource type and size (e.g., 64 k flash)), while I/O nodes may be configured to inform regarding their available resources (e.g., shared storage type and size, shared network type and bandwidth, optimal number of nodes that can share each resource, dedicated resource types and number of each type, etc.).

In an embodiment, there are two different options provided to curtail the duration of this step (which may be a matter of design choice). A first option is to enable a programmable timer on each node for a predetermined duration that starts on entry to the node and resource discovery step and on expiration of the timer the process is exited. A second option is to provide an indicator (e.g., a single bit or multiple bit flag) per node, where each node includes a storage such as a register that is configured to store as many flags as the number of nodes in the clustered system (a design could assume a maximum number of nodes that it can support in a cluster and define the storage size to maintain these flags). Thus a local node sets a flag for each remote node when it receives resource response information from that remote node.

In an embodiment, one or more nodes may be designated as the initiator of the first wave of broadcast messages. As one example, a management node can be the sole initiator. In another case, multiple nodes including the management node may be the initiators of the broadcast message wave. Note that a clustered system may have more than one management node for redundancy and fail-over purposes.

In this node and resource discovery setup during a first phase, all the designated nodes transmit a pre-programmed number of query resource broadcast messages on all its egress ports. Each node that receives the query resource broadcast message on any of its ingress ports checks to make sure that the message is not self-generated. If the message is not-self generated, the receiving node transmits the same broadcast message on all of its egress ports. This process is repeated by each node to re-transmit a pre-programmed number of query resource broadcast messages on behalf of all the designated nodes that generated the query resource broadcast message. The nodes track this fact by using one of the two curtail mechanisms discussed above.

Then the state machine of a node transitions to a second phase of the node and resource discovery step. In this phase, each node that received a query resource message from any of the designated transmit nodes on any of its ingress ports responds by transmitting a pre-programmed number of resource response broadcast message on all of its egress ports. Each node that receives the resource response broadcast message on any of its ingress port checks to make sure that the message is not self-generated. If it is not self-generated, the node transmits the same broadcast message on all of its egress ports. This process is repeated by each node to re-transmit a pre-programmed number of resource response broadcast messages on behalf of all the designated nodes that generated the query resource broadcast message. The nodes track this fact by using one of the two curtail mechanisms.

In one embodiment, the query neighbor and query resource messages can be implemented using PCIe vendor defined Type1 messages. As illustrated in FIG. 6 these messages may be implemented having 4 double word headers including a PCIe-defined portion and an implementation-specific portion without data and a message routing field set to "Local—Terminate at Receiver" and "Broadcast from Root Complex," respectively. In this embodiment, the neighbor response and resource response messages can be implemented using PCIe vendor defined Type1 messages. As illustrated in FIG. 7, these messages may be implemented having 4 double word headers including a PCIe-defined portion and an implementation-specific portion with data and a message routing field set to "Local—Terminate at Receiver" and "Broadcast from Root Complex," respectively. Note that the data length can be different and can be programmable for a particular implementation.

At the end of the node and resource discovery step, each node in the clustered system may include a data structure having information regarding the attributes of all other nodes in the clustered system (which, depending on node configuration it may maintain or discard). At this point, the designated management node can execute a configuration software stack to process the data structure. As an example, the management node can generate statistics on the number of nodes in the cluster, an identification of the different kinds of nodes (compute, I/O and management) and their count, and information regarding the full network topology. It also can generate a map of the different kinds of available resources at each node that can be shared, different kinds of resource consumption requested by each node, among other information.

With this information, the management node can configure each node for its proper functioning. Many different configuration options may be available. As examples, the management node may program a port-specific routing table of each node to enable transaction flow from any node to any node, program configuration registers (e.g., of the nodes and resources) to enable different kinds of resource (e.g., storage, networking, etc.) sharing between the nodes, among other configuration operations. For example, configuration registers may be programmed to assign dedicated resources in I/O nodes to requesting compute nodes.

Figure 8A:
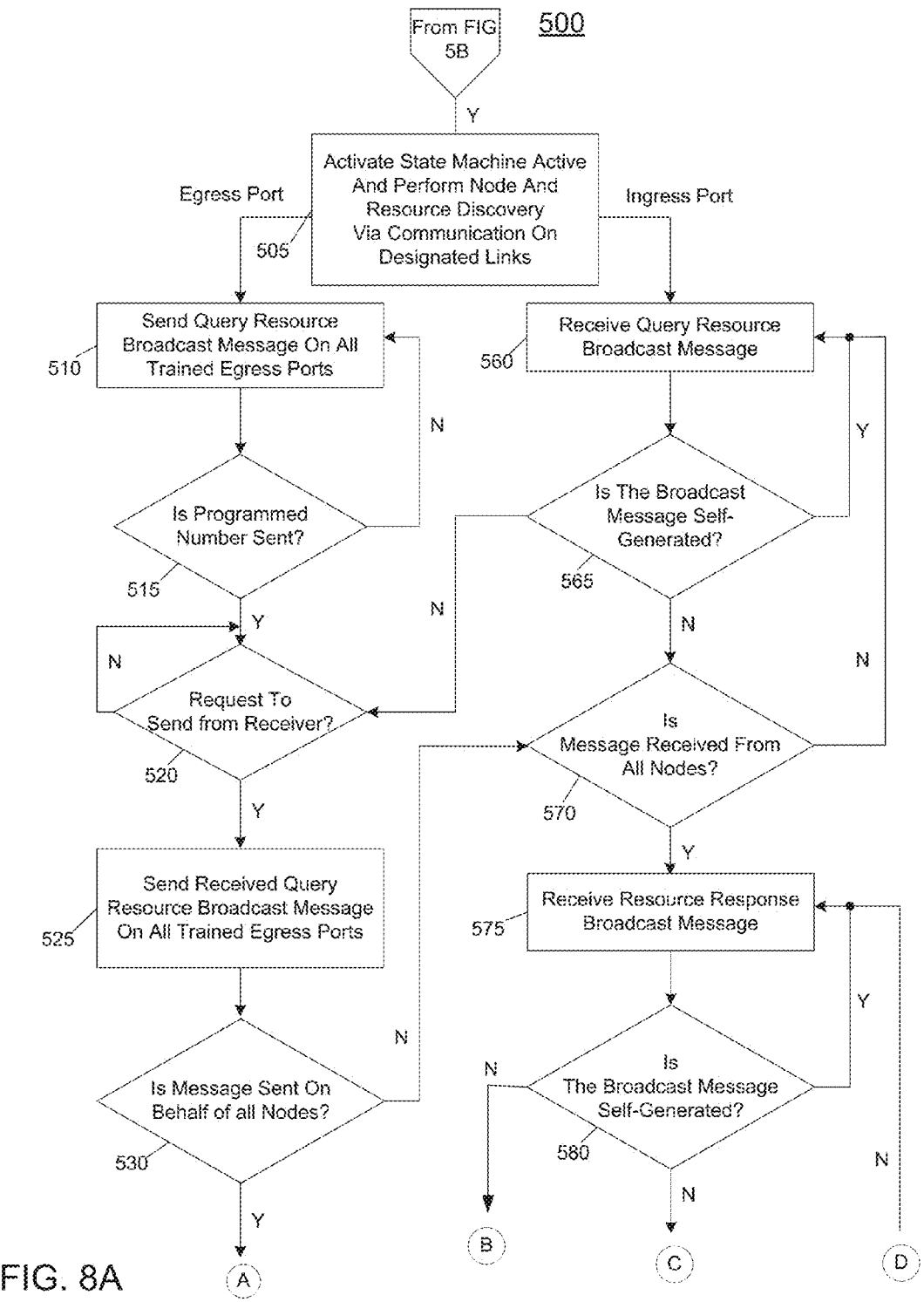
FIGS. 8A and 8B are flow diagrams of a method of a second step of a discovery and configuration process in accordance with an embodiment of the present invention.
Figure 8B:
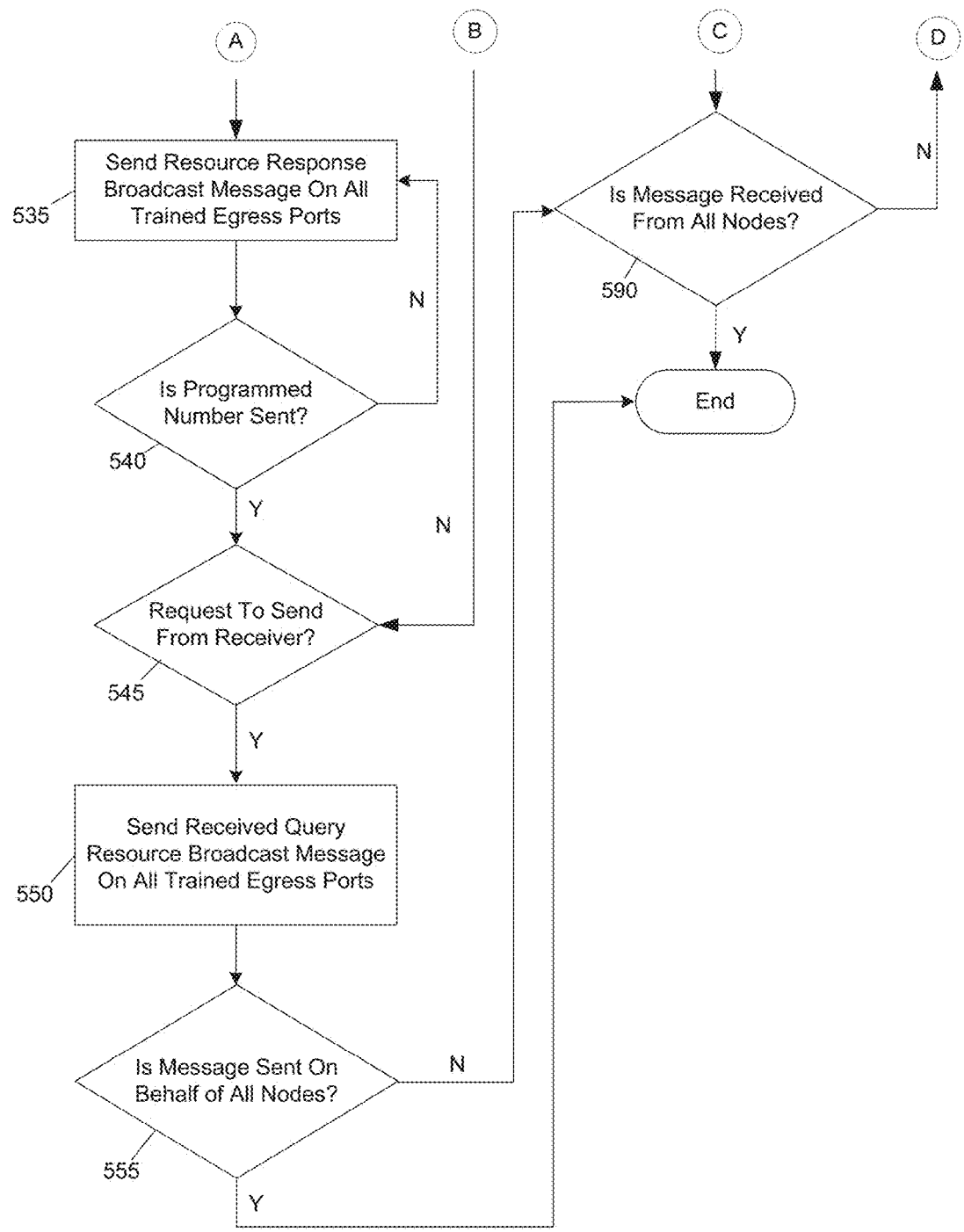

Referring now to FIGS. 8A and 8B, shown are flow diagrams of another method in accordance with an embodiment. Method 500 shown relates to a second portion of a discovery protocol, namely a node and resource discovery protocol. As seen, method 500 begins at block 505, where a state machine is activated and a node and resource discovery process is performed on designated links. As above, various branches may be performed depending on whether a particular port is an egress port or an ingress port.

First with reference to egress port operations, control passes to block 510 where a query resource message is sent. More specifically, this message is a broadcast message that is communicated on all trained egress ports. Next at diamond 515 it is determined whether a programmed number of such messages have been sent. Although the scope of the present invention is not limited, in an embodiment 16 such messages may be sent from each egress port. When it is determined that the programmed number has been sent, control passes to diamond 520 to determine whether a request to send has been received from the corresponding receiver (of the node). If so, control passes to block 525 where a resource broadcast message is sent on all trained egress ports. Next it is determined at diamond 530 whether this message has been sent on behalf of all nodes. If so, control passes to block 535 where a resource response broadcast message may be sent on all trained egress ports (and if not control passes to diamond 570, described below with regard to ingress port operations). At diamond 540 it is determined whether a programmed number of such messages have been sent. If so, control passes to diamond 545 to determine whether a request to send has been received from the receiver. If so, control passes next to block 550 where a received resource broadcast message can be sent on all trained egress ports. Thereafter control passes to diamond 555 where it is determined whether the message is sent on behalf of all nodes. If so, method 500 may conclude. Otherwise, control passes to diamond 590, discussed below.

Still in reference to FIGS. 8A and 8B, ingress port operation begins at block 560 where a query resource broadcast message is received. Thereafter, control passes to diamond 565 to determine whether the broadcast message is self-generated. Although the scope of the present invention is not limited in this regard, in one embodiment the self-generation determination may be based on a requester ID of the message header, which corresponds to the NodeID of the particular node. If it is determined that this message is self-generated, control passes to block 560, above. If instead the message is not self-generated, control passes to diamond 570 where it is determined whether this message has been received from all nodes. In addition a request to send is sent to the corresponding egress port. If the query resource broadcast message is not received from all nodes, control returns to block 560. Otherwise, when the query resource message is received from all nodes, control passes to block 575 where a resource response broadcast message is received.

Still in reference to FIG. 8, from block 575, control passes to diamond 580 to determine whether the broadcast message is self-generated. If so, control passes above to block 575. If not, control passes to diamond 590 to determine whether a message is received from all nodes. In addition a request to send is sent to the corresponding egress port. If the resource response message is received from all nodes, method 500 concludes, otherwise control passes back to block 575, discussed above. While shown at this high level in the embodiment of FIGS. 8A and 8B, many variations and alternatives are possible.

Thus in an embodiment, a discovery process may be performed to identify; the number of nodes and corresponding node identifiers; the kind of resources associated with a node that can be shared between other nodes in the cluster; the resource(s) requested by any other node in the cluster; and any other architecturally relevant information to enable and improve resource sharing between nodes (e.g., generating and providing a routing table to be associated with each interconnect port).

Using an embodiment of the present invention, a topology and network configuration multi-node/multi-host/multi-cluster system having PCIe or other interconnect technology may be generated while ensuring compliance with a given communication protocol (e.g., PCIe).

Figure 9:
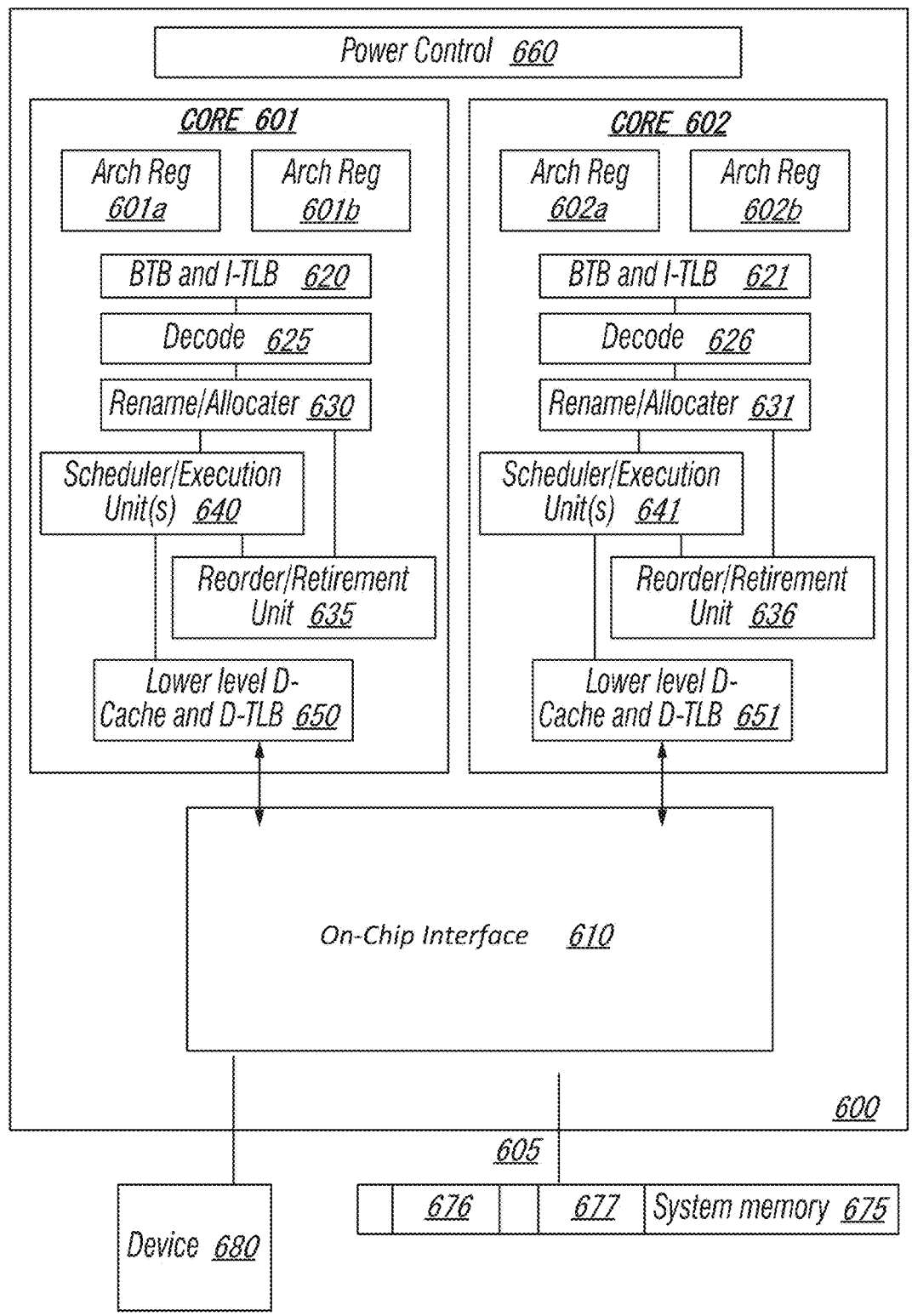
FIG. 9 is a diagram illustrating an embodiment of a block diagram for a computing system including a multicore processor.

Referring to FIG. 9, an embodiment of a block diagram for a computing system including a multicore processor is depicted. Processor 600 includes any processor or processing device, such as a microprocessor, an embedded processor, a digital signal processor (DSP), a network processor, a handheld processor, an application processor, a co-processor, a system on a chip (SOC), or other device to execute code. Processor 600, in one embodiment, includes at least two cores—core 601 and 602, which may include asymmetric cores or symmetric cores (the illustrated embodiment). However, processor 600 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 600, as illustrated in FIG. 9, includes two cores—core 601 and 602. Here, cores 601 and 602 are considered symmetric cores, i.e., cores with the same configurations, functional units, and/or logic. In another embodiment, core 601 includes an out-of-order processor core, while core 602 includes an in-order processor core. However, cores 601 and 602 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e., asymmetric cores), some form of translation, such a binary translation, may be utilized to schedule or execute code on one or both cores. Yet to further the discussion, the functional units illustrated in core 601 are described in further detail below, as the units in core 602 operate in a similar manner in the depicted embodiment.

As depicted, core 601 includes two hardware threads 601a and 601b, which may also be referred to as hardware thread slots 601a and 601b. Therefore, software entities, such as an operating system, in one embodiment potentially view processor 600 as four separate processors, i.e., four logical processors or processing elements capable of executing four software threads concurrently. As alluded to above, a first thread is associated with architecture state registers 601a, a second thread is associated with architecture state registers 601b, a third thread may be associated with architecture state registers 602a, and a fourth thread may be associated with architecture state registers 602b. Here, each of the architecture state registers (601a, 601b, 602a, and 602b) may be referred to as processing elements, thread slots, or thread units, as described above. As illustrated, architecture state registers 601a are replicated in architecture state registers 601b, so individual architecture states/contexts are capable of being stored for logical processor 601a and logical processor 601b. In core 601, other smaller resources, such as instruction pointers and renaming logic in allocator and renamer block 630 may also be replicated for threads 601a and 601b. Some resources, such as re-order buffers in reorder/retirement units 635, 636, ILTB 620, load/store buffers, and queues may be shared through partitioning. Other resources, such as general purpose internal registers, page-table base register(s), low-level data-cache and data-TLB, execution unit(s) 640, 641, and other portions of reorder/retirement unit 635, 636 are potentially fully shared.

Processor 600 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 601 includes a simplified, representative out-of-order (OOO) processor core. But an in-order processor may be utilized in different embodiments. The OOO core includes a branch target buffer 620 to predict branches to be executed/taken and an instruction-translation buffer (I-TLB) 620 to store address translation entries for instructions.

Core 601 further includes decode module 625 coupled to fetch unit 620 to decode fetched elements. Fetch logic, in one embodiment, includes individual sequencers associated with thread slots 601a, 601b, respectively. Usually core 601 is associated with a first ISA, which defines/specifies instructions executable on processor 600. Often machine code instructions that are part of the first ISA include a portion of the instruction (referred to as an opcode), which references/specifies an instruction or operation to be performed. Decode logic 625 includes circuitry that recognizes these instructions from their opcodes and passes the decoded instructions on in the pipeline for processing as defined by the first ISA. For example, as discussed in more detail below decoder 625, in one embodiment, include logic designed or adapted to recognize specific instructions, such as transactional instruction. As a result of the recognition by decoder 625, the architecture or core 601 takes specific, predefined actions to perform tasks associated with the appropriate instruction. It is important to note that any of the tasks, blocks, operations, and methods described herein may be performed in response to a single or multiple instructions; some of which may be new or old instructions. Note decoder 626, in one embodiment, recognize the same ISA (or a subset thereof). Alternatively, in a heterogeneous core environment, decoder 626 recognize a second ISA (either a subset of the first ISA or a distinct ISA).

In one example, allocator and renamer blocks 630, 631 include an allocator to reserve resources, such as register files to store instruction processing results. However, threads 601a and 601b are potentially capable of out-of-order execution, where allocator and renamer blocks 630, 631 also reserve other resources, such as reorder buffers to track instruction results. Units 630, 631 may also include a register renamer to rename program/instruction reference registers to other registers internal to processor 600. Reorder/retirement units 635, 636 include components, such as the reorder buffers mentioned above, load buffers, and store buffers, to support out-of-order execution and later in-order retirement of instructions executed out-of-order.

Scheduler and execution unit(s) blocks 640, 641, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 650, 651 are coupled to execution unit(s) 640, 641. The data cache is to store recently used/operated on elements, such as data operands, which are potentially held in memory coherency states. The DTLB is to store recent virtual/linear to physical address translations. As a specific example, a processor may include a page table structure to break physical memory into a plurality of virtual pages.

Here, cores 601 and 602 share access to higher-level or further-out cache, such as a second level cache associated with on-chip interface 610. Note that higher-level or further-out refers to cache levels increasing or getting further way from the execution unit(s). In one embodiment, higher-level cache is a last-level data cache—last cache in the memory hierarchy on processor 600—such as a second or third level data cache. However, higher level cache is not so limited, as it may be associated with or include an instruction cache. A trace cache—a type of instruction cache—instead may be coupled after decoder 625 to store recently decoded traces. Here, an instruction potentially refers to a macro-instruction (i.e., a general instruction recognized by the decoders), which may decode into a number of micro-instructions (micro-operations).

In the depicted configuration, processor 600 also includes on-chip interface module 610. Historically, a memory controller has been included in a computing system external to processor 600. In this scenario, on-chip interface 610 is to communicate with devices external to processor 600, such as system memory 675, a chipset (often including a memory controller hub to connect to memory 675 and an I/O controller hub to connect peripheral devices), a memory controller hub, a northbridge, or other integrated circuit. And in this scenario, bus 605 may include any known interconnect, such as multi-drop bus, a point-to-point interconnect, a serial interconnect, a parallel bus, a coherent (e.g., cache coherent) bus, a layered protocol architecture, a differential bus, and a GTL bus.

Memory 675 may be dedicated to processor 600 or shared with other devices in a system. Common examples of types of memory 675 include DRAM, SRAM, non-volatile memory (NV memory), and other known storage devices. Note that device 680 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 600. For example in one embodiment, a memory controller hub is on the same package and/or die with processor 600. Here, a portion of the core (an on-core portion) 610 includes one or more controller(s) for interfacing with other devices such as memory 675 or a graphics device 680. The configuration including an interconnect and controllers for interfacing with such devices is often referred to as an on-core (or un-core configuration). As an example, on-chip interface 610 includes a ring interconnect for on-chip communication and a high-speed serial point-to-point link 605 for offchip communication. Yet, in the SOC environment, even more devices, such as the network interface, co-processors, memory 675, graphics processor 680, and any other known computer devices/interface may be integrated on a single die or integrated circuit to provide small form factor with high functionality and low power consumption.

In one embodiment, processor 600 is capable of executing a compiler, optimization, and/or translator code 677 to compile, translate, and/or optimize application code 676 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e., generally where syntactic processing, semantic processing, and some transformation/optimization may take place, and (2) a back-end, i.e., generally where analysis, transformations, optimizations, and code generation takes place. Some compilers refer to a middle, which illustrates the blurring of delineation between a frontend and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 10:
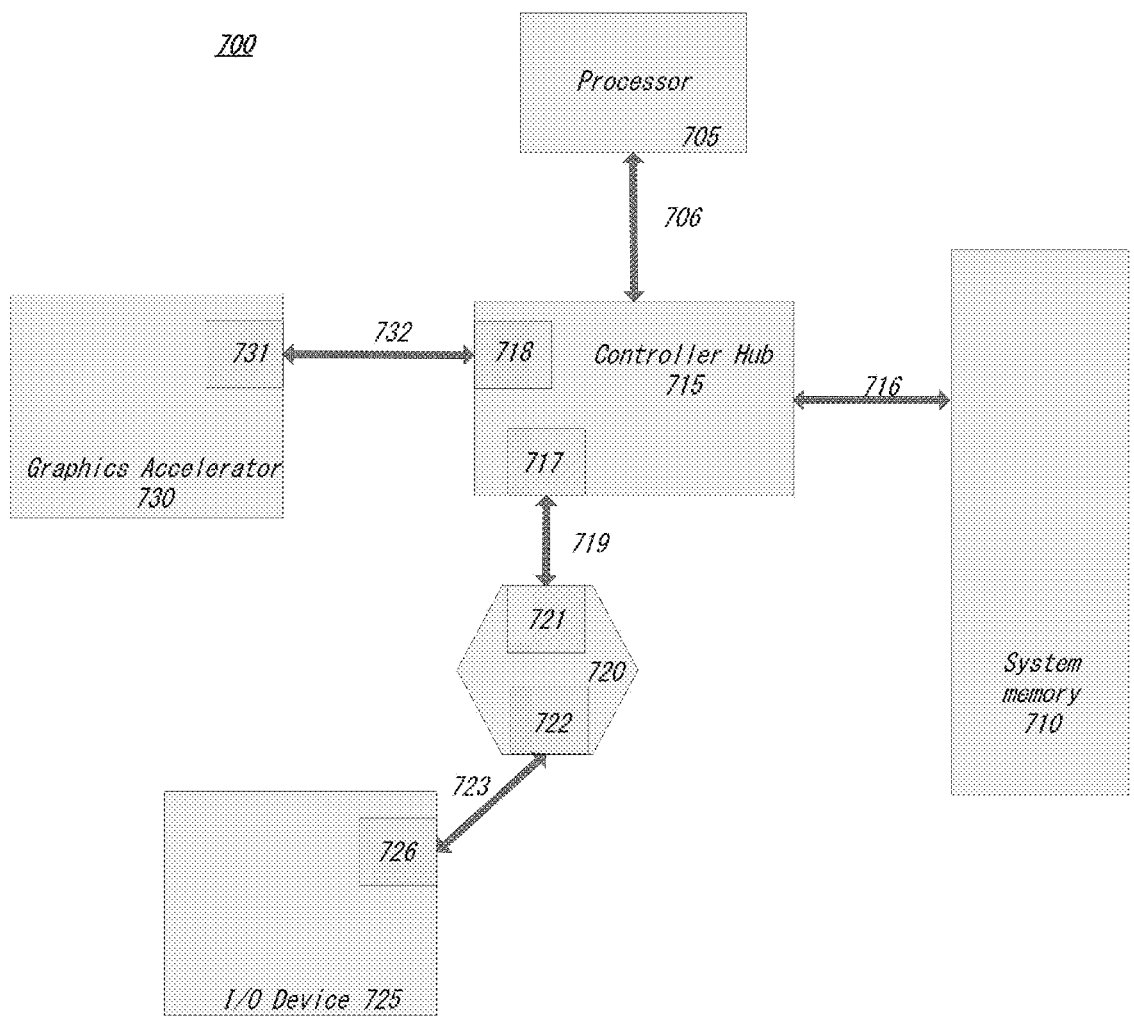
FIG. 10 is a schematic diagram illustrating an embodiment of a computing system including a Peripheral Component Interconnect Express (PCIe) compliant architecture.

Referring to FIG. 10, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH), a southbridge, and a root controller/hub. Often the term chipset refers to two physically separate controller hubs, i.e., a memory controller hub (MCH) coupled to an interconnect controller hub (ICH). Note that current systems often include the MCH integrated with processor 705, while controller 715 is to communicate with I/O devices, in a similar manner as described below. In one embodiment, peer-to-peer routing is optionally supported through the root complex device.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725 (i.e., interface ports 22, 726 through serial link 723). Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 11:
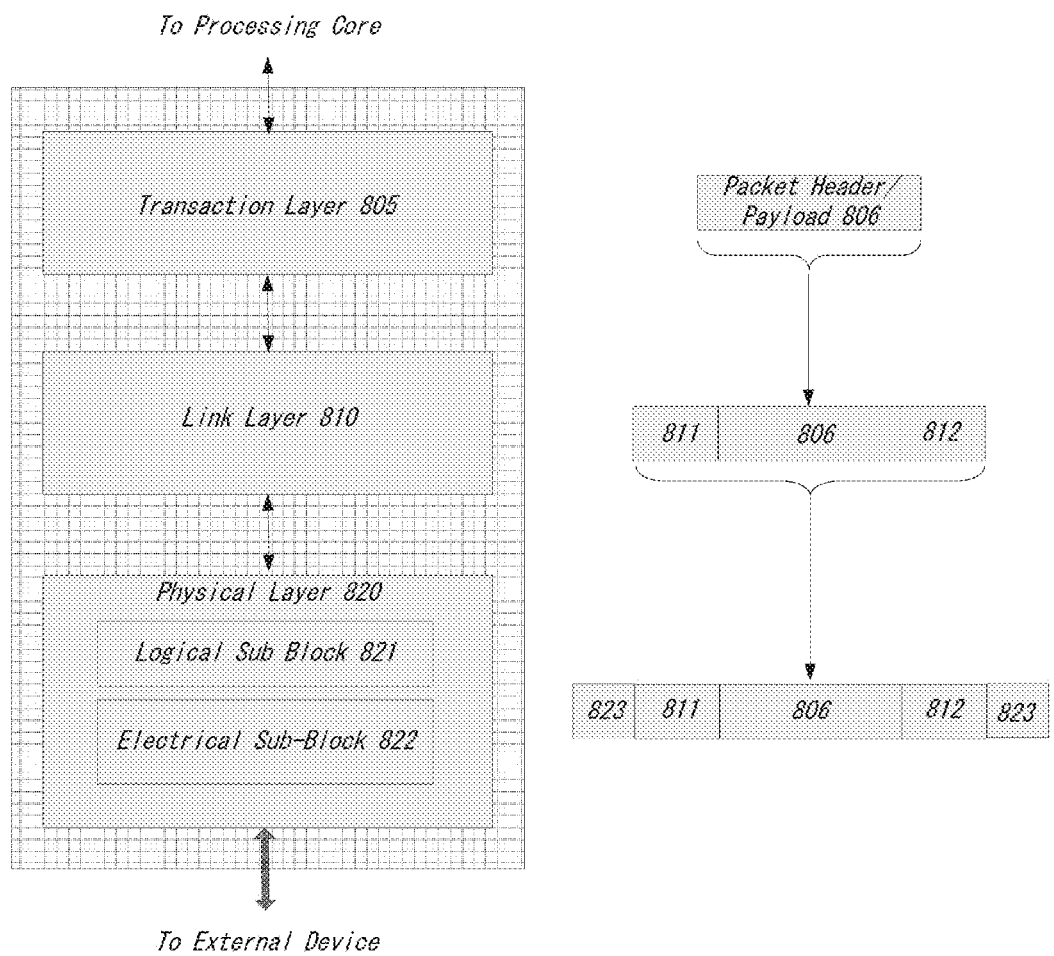
FIG. 11 is a schematic diagram illustrating an embodiment of a PCIe compliant interconnect architecture including a layered stack.
Figure 12:
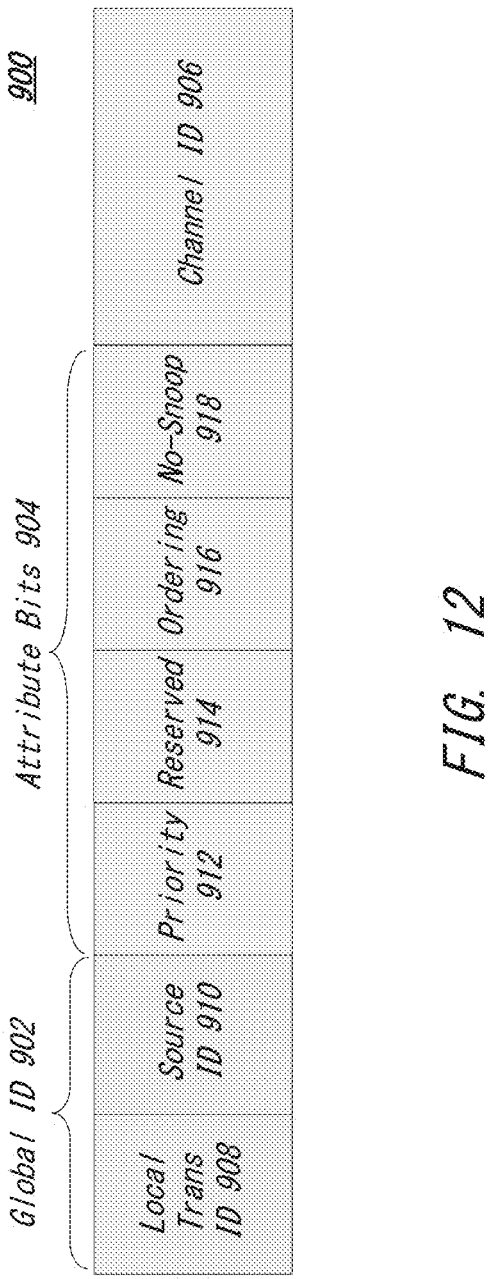
FIG. 12 is a schematic diagram illustrating an embodiment of a PCIe compliant request or packet to be generated or received within an interconnect architecture.
Figure 13:
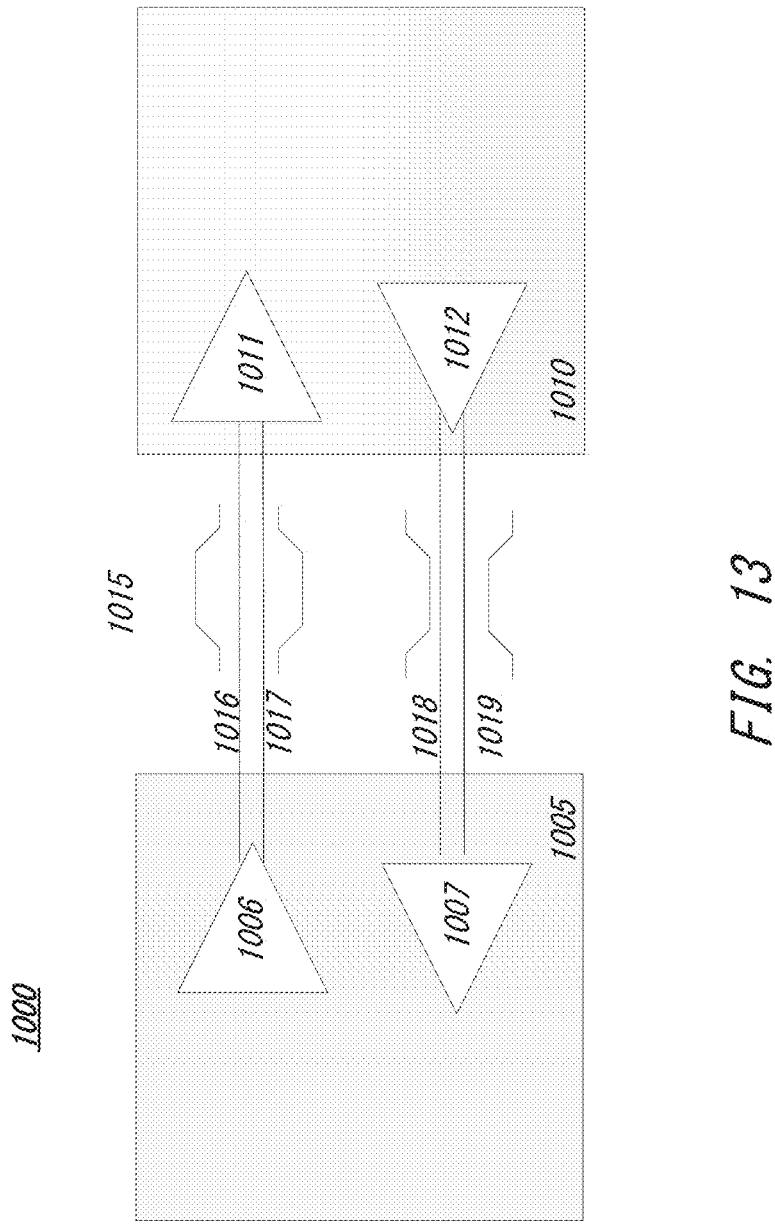
FIG. 13 is a schematic diagram illustrating an embodiment of a PCIe serial point to point fabric.

Turning to FIG. 11 an embodiment of a layered protocol stack is illustrated. Layered protocol stack 800 includes any form of a layered communication stack, such as a Quick Path Interconnect (QPI) stack, a PCIe stack, a next generation high performance computing interconnect stack, or other layered stack. Although the discussion immediately below in reference to FIGS. 11-13 are in relation to a PCIe stack, the same concepts may be applied to other interconnect stacks. In one embodiment, protocol stack 800 is a PCIe protocol stack including transaction layer 805, link layer 810, and physical layer 820. An interface may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that may be processed by the Transaction Layer 805 of the receiving device.

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The transaction layer 805 typically manages credit-based flow control for TLPs. PCIe implements split transactions, i.e., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 10, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Quickly referring to FIG. 12, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 918 is utilized to determine if transactions are snooped. As shown, channel ID Field 906 identifies a channel that a transaction is associated with.

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e., an identification number or packet number, calculates and applies an error detection code, i.e., CRC 812, and submits the modified TLPs to the Physical Layer 820 for transmission across a physical to an external device.

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8 b/10 b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e., a transaction layer; a second layer to sequence packets, i.e., a link layer; and a third layer to transmit the packets, i.e., a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Referring next to FIG. 13, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device

1010. In other words, two transmitting paths, i.e., paths 1016 and 1017, and two receiving paths, i.e., paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e., a rising edge, line 1017 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies.

The following examples pertain to further embodiments.

In one example, a system comprises: a plurality of compute nodes, the plurality of compute nodes having a first core, a first memory, and a first fabric; a plurality of I/O nodes, the plurality of I/O nodes having a second core, a second memory, and a second fabric, the plurality of I/O nodes to couple to one or more I/O devices; at least one management node to receive discovery information responsive to execution of a discovery process by the plurality of compute nodes and the plurality of I/O nodes, the discovery information including resource request information from the plurality of compute nodes and resource availability information from the plurality of I/O nodes, and configure the plurality of compute nodes and the plurality of I/O nodes based thereon; and an interconnection fabric to couple the plurality of compute nodes, the plurality of I/O nodes, and the at least one management node, where the at least one management node is to enable the one or more I/O devices to be shared between at least some of the plurality of compute nodes based on the discovery information.

In an example, the plurality of compute nodes, the plurality of I/O nodes, and the at least one management node are to perform the discovery process comprising a neighbor discovery protocol and a node and resource discovery protocol.

In an example, the at least one management node is to configure the plurality of compute nodes and the plurality of I/O nodes based at least in part on a result of the neighbor discovery protocol and the node and resource discovery protocol.

In an example, the result of the neighbor discovery protocol and the node and resource discovery protocol comprises one or more data structures to identify a number of nodes of the system, node identifiers for the number of nodes, and resource information.

In an example, a first node of the plurality of compute nodes is to generate a neighbor map based on the neighbor discovery protocol, the neighbor map including a first number of ports of the first node, a second number of trained ports of the first node, and port identifiers of the trained ports and corresponding node identifiers of a plurality of neighbor nodes coupled to the first node.

In an example, a first compute node of the plurality of compute nodes is to couple to a plurality of neighbor nodes in three dimensions, the plurality of neighbor nodes including at least two of the plurality of compute nodes and at least two of the plurality of I/O nodes.

In an example, the system further comprises: a compute module including at least some of the plurality of compute nodes; and an I/O module including at least some of the plurality of I/O nodes.

In an example, the system further comprises a plurality of resources coupled to the plurality of I/O nodes, at least some of the plurality of resources to be shared by the at least some of the plurality of compute nodes.

Note that the above nodes can be implemented using various means. In an example, a given node may comprise one or more SoCs.

In another example, a method comprises: sending a plurality of query neighbor messages from a first node of a multi-node system including a plurality of nodes to a plurality of neighbor nodes coupled to the first node, receiving a plurality of neighbor response messages from the plurality of neighbor nodes, and generating a neighbor node map therefrom; sending a plurality of query resource messages from the first node to the plurality of neighbor nodes, the plurality of neighbor nodes in turn to re-send the plurality of query resource messages to a plurality of second neighbor nodes coupled to the plurality of neighbor nodes, and receiving a plurality of resource response messages from the plurality of neighbor nodes; and generating a data structure including information associated with the plurality of nodes, including resource information associated with at least some of the plurality of nodes.

In an example, generating the neighbor node map comprises storing in the neighbor node map a first number of ports of the first node, a second number of trained ports of the first node, and port identifiers of the trained ports and corresponding node identifiers for the plurality of neighbor nodes.

In an example, the method further comprises generating the data structure in a management node of the multi-node system.

In an example, the method further comprises generating the data structure based at least in part on the plurality of resource response messages received from the plurality of neighbor nodes.

In an example, the management node comprises the first node, the first node comprising an I/O node coupled to one or more resources and configured to initiate a node and resource discovery protocol by sending the plurality of query resource messages.

In an example, the method further comprises configuring, via the management node, the plurality of nodes based at least in part on the data structure.

In an example, configuring the plurality of nodes comprises configuring a routing table of at least one of the plurality of nodes and programming one or more configuration registers.

In an example, the method further comprises receiving a second plurality of query resource messages in the first node and re-sending the second plurality of query resource messages to the plurality of neighbor nodes.

In another example, a computer readable medium including instructions is to perform the method of any of the above examples.

In another example, an apparatus comprises means for performing the method of any one of the above examples.

In a further example, an apparatus comprises: at least one core; and a memory coupled to the at least one core, the memory to store a neighbor node map, the neighbor node map generated by the at least one core during a discovery protocol of a multi-cluster system having a plurality of nodes including the apparatus, the apparatus comprising a local node, the neighbor node map including a first field to store a first number corresponding to a number of ports of the local node, a second field to store a second number corresponding to a number of trained ports of the local node, and a plurality of assignment fields to store a port identifier for a port of the local node and a node identifier of a neighbor node to which the port is to couple, where responsive to configuration of the multi-cluster system, the local node is to share one or more resources with other nodes of the multi-cluster system.

In an example, the local node comprises an ingress port and an egress port to couple to a first neighbor node.

In an example, the local node is to perform a neighbor node discovery portion of the discovery protocol in which a plurality of query neighbor messages are to be sent from the local node to a plurality of neighbor nodes to couple to the local node and a plurality of neighbor response messages are to be received from the plurality of neighbor nodes, and a neighbor node map is to be generated therefrom.

In an example, the local node is to thereafter perform a node and resource discovery portion of the discovery protocol in which a plurality of query resource messages are to be sent from the local node to the plurality of neighbor nodes, the plurality of neighbor nodes in turn to re-send the plurality of query resource messages to a plurality of second neighbor nodes coupled to the plurality of neighbor nodes, and a plurality of resource response messages are to be received from the plurality of neighbor nodes.

In a still further example, a computer readable storage medium including code, when manufactured, is to cause a SoC to: send a plurality of query neighbor messages from a first node of a multi-node system including a plurality of nodes, the first node adapted on the SoC, to a plurality of neighbor nodes coupled to the first node, receive a plurality of neighbor response messages from the plurality of neighbor nodes, and generate a neighbor node map therefrom; send a plurality of query resource messages from the first node to the plurality of neighbor nodes, the plurality of neighbor nodes in turn to re-send the plurality of query resource messages to a plurality of second neighbor nodes coupled to the plurality of neighbor nodes, and receive a plurality of resource response messages from the plurality of neighbor nodes; and generate a data structure including information associated with the plurality of nodes, including resource information associated with at least some of the plurality of nodes.

In an example, the computer readable storage medium further comprises code, when manufactured, to cause the SoC to store in the neighbor node map a first number of ports of the first node, a second number of trained ports of the first node, and port identifiers of the trained ports and corresponding node identifiers for the plurality of neighbor nodes.

In an example, the computer readable storage medium further comprises code, when manufactured, to cause the SoC to generate the data structure based at least in part on the plurality of resource response messages received from the plurality of neighbor nodes.

In an example, the computer readable storage medium further comprises code, when manufactured, to cause the SoC to receive a second plurality of query resource messages in the first node and re-send the second plurality of query resource messages to the plurality of neighbor nodes.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Still other embodiments may be implemented in code stored on a non-transitory computer readable storage medium including code, data and/or other information when manufactured to cause a SoC or other semiconductor chip to perform a series of instructions and/or other operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a plurality of compute nodes, the plurality of compute nodes having a first core, a first memory, and a first fabric;
a plurality of input/output (I/O) nodes, the plurality of I/O nodes having a second core, a second memory, and a second fabric, the plurality of I/O nodes to couple to one or more I/O devices;
at least one management node to receive discovery information responsive to execution of a discovery process comprising a neighbor discovery protocol and a node and resource discovery protocol by the plurality of compute nodes and the plurality of I/O nodes, the discovery information including resource request information from the plurality of compute nodes and resource availability information from the plurality of I/O nodes, and configure the plurality of compute nodes and the plurality of I/O nodes based thereon, wherein a first node of the plurality of compute nodes is to generate a neighbor map based on the neighbor discovery protocol, the neighbor map including a first number of ports of the first node, a second number of trained ports of the first node, and port identifiers of the trained ports and corresponding node identifiers of a plurality of neighbor nodes coupled to the first node; and an interconnection fabric to couple the plurality of compute nodes, the plurality of I/O nodes, and the at least one management node, wherein the at least one management node is to enable the one or more I/O devices to be shared between at least some of the plurality of compute nodes based on the discovery information.

2. The system of claim 1, wherein the at least one management node is to configure the plurality of compute nodes and the plurality of I/O nodes based at least in part on a result of the neighbor discovery protocol and the node and resource discovery protocol.

3. The system of claim 2, wherein the result of the neighbor discovery protocol and the node and resource discovery protocol comprises one or more data structures to identify a number of nodes of the system, node identifiers for the number of nodes, and resource information.

4. The system of claim 1, wherein the first node of the plurality of compute nodes is to couple to the plurality of neighbor nodes in three dimensions, the plurality of neighbor nodes including at least two of the plurality of compute nodes and at least two of the plurality of I/O nodes.

5. The system of claim 1, further comprising:
a compute module including at least some of the plurality of compute nodes; and
an I/O module including at least some of the plurality of I/O nodes.

6. The system of claim 5, further comprising a plurality of resources coupled to the plurality of I/O nodes, at least some of the plurality of resources to be shared by the at least some of the plurality of compute nodes.

7. A method comprising:
sending a plurality of query neighbor messages from a first node of a multi-node system including a plurality of nodes to a plurality of neighbor nodes coupled to the first node, receiving a plurality of neighbor response messages from the plurality of neighbor nodes, and generating a neighbor node map therefrom, including storing in the neighbor node map a first number of ports of the first node, a second number of trained ports of the first node, and port identifiers of the trained ports and corresponding node identifiers for the plurality of neighbor nodes;
sending a plurality of query resource messages from the first node to the plurality of neighbor nodes, the plurality of neighbor nodes in turn to re-send the plurality of query resource messages to a plurality of second neighbor nodes coupled to the plurality of neighbor nodes, and receiving a plurality of resource response messages from the plurality of neighbor nodes; and
generating a data structure including information associated with the plurality of nodes, including resource information associated with at least some of the plurality of nodes.

8. The method of claim 7, further comprising generating the data structure in a management node of the multi-node system.

9. The method of claim 8, further comprising generating the data structure based at least in part on the plurality of resource response messages received from the plurality of neighbor nodes.

10. The method of claim 9, wherein the management node comprises the first node, the first node comprising an input/output (I/O) node coupled to one or more resources and configured to initiate a node and resource discovery protocol by sending the plurality of query resource messages.

11. The method of claim 10, further comprising configuring, via the management node, the plurality of nodes based at least in part on the data structure.

12. The method of claim 11, wherein configuring the plurality of nodes comprises configuring a routing table of at least one of the plurality of nodes and programming one or more configuration registers.

13. The method of claim 7, further comprising receiving a second plurality of query resource messages in the first node and re-sending the second plurality of query resource messages to the plurality of neighbor nodes.

14. An apparatus comprising:
at least one core;
at least one memory;
at least one communication fabric;
wherein the at least one memory is to store instructions that enable the apparatus to:
receive discovery information of a plurality of compute nodes and a plurality of input/output (I/O) nodes of a system, the plurality of I/O nodes coupled to at least one I/O device, responsive to execution of a discovery process comprising a neighbor discovery protocol and a node and resource discovery protocol, the discovery information including resource request information from the plurality of compute nodes and resource availability information from the plurality of I/O nodes;
generate a neighbor map based on the neighbor discovery protocol, the neighbor map including a first number of ports of the apparatus, a second number of trained ports of the apparatus, and port identifiers of the trained ports and corresponding node identifiers of a plurality of neighbor nodes coupled to the apparatus; and
configure the plurality of compute nodes and the plurality of I/O nodes based at least in part on the discovery information; and
wherein the apparatus comprises a management node to enable the at least one I/O device to be shared between at least some of the plurality of compute nodes based at least in part on the discovery information.

15. The apparatus of claim 14, wherein the management node is to configure the plurality of compute nodes and the plurality of I/O nodes based at least in part on a result of the neighbor discovery protocol and the node and resource discovery protocol.

16. The apparatus of claim 15, wherein the result of the neighbor discovery protocol and the node and resource discovery protocol comprises one or more data structures to identify a number of nodes of the system, node identifiers for the number of nodes, and resource information.

17. The apparatus of claim 14, wherein the management node is to configure a first compute node of the plurality of compute nodes to couple to a plurality of neighbor nodes in three dimensions, the plurality of neighbor nodes including at least two of the plurality of compute nodes and at least two of the plurality of I/O nodes.

* * * * *